(12) United States Patent
Schneider et al.

(10) Patent No.: US 8,733,209 B2
(45) Date of Patent: May 27, 2014

(54) DRIVE ARRANGEMENT WITH AN INFINITELY VARIABLE SUB-GEAR BOX

(75) Inventors: Heinz-Dieter Schneider, Siegburg (DE); Dieter Voigt, Aachen (DE)

(73) Assignee: Ulrich Rohs, Düren (DE)

( * ) Notice: Subject to any disclaimer, the term of this patent is extended or adjusted under 35 U.S.C. 154(b) by 670 days.

(21) Appl. No.: 12/449,613

(22) PCT Filed: Oct. 25, 2007

(86) PCT No.: PCT/DE2007/001912
§ 371 (c)(1),
(2), (4) Date: Aug. 17, 2009

(87) PCT Pub. No.: WO2008/104142
PCT Pub. Date: Sep. 4, 2008

(65) Prior Publication Data
US 2010/0113211 A1  May 6, 2010

(30) Foreign Application Priority Data
Feb. 26, 2007  (DE) .......................... 10 2007 009 631

(51) Int. Cl.
*F16H 37/08* (2006.01)
*B60K 6/48* (2007.10)

(52) U.S. Cl.
USPC ....... 74/665 C; 476/52; 180/65.245; 180/65.7

(58) Field of Classification Search
USPC .............. 476/52; 180/65.1, 65.2, 65.4, 65.21, 180/65.245, 65.7; 74/665 A, 665 C
See application file for complete search history.

(56) References Cited

U.S. PATENT DOCUMENTS

| 760,460 | A | * | 5/1904 | Leighton et al. ................. 476/53 |
| 2,512,454 | A | | 6/1950 | Wullschleger |
| 6,007,443 | A | | 12/1999 | Onimaru et al. |
| 6,024,667 | A | | 2/2000 | Krohm et al. |
| 6,227,997 | B1 | * | 5/2001 | Fujisawa et al. ................... 477/5 |
| 6,269,895 | B1 | | 8/2001 | Tanuguchi et al. |
| 6,344,008 | B1 | | 2/2002 | Nagano et al. |
| 6,491,602 | B1 | | 12/2002 | Höhn |
| 6,887,180 | B2 | | 5/2005 | Pels et al. |

(Continued)

FOREIGN PATENT DOCUMENTS

| DE | 513 390 | 11/1930 |
| DE | 43 42 735 | 6/1995 |

(Continued)

OTHER PUBLICATIONS

European Office Action dated Aug. 19, 2010, 3 pages with English translation.

(Continued)

*Primary Examiner* — William C Joyce
(74) *Attorney, Agent, or Firm* — Collard & Roe, P.C.

(57) ABSTRACT

In order to further develop drive arrangements with a continuously variable sub-gear mechanism, the invention proposes a drive arrangement with a continuously variable sub-gear mechanism having two circulating transmission elements, which are actively connected to one another via a circulating connecting element, having a hybrid drive comprising a first drive and at least one additional drive, and further having at least one output, wherein at least one of the two drives is interactively connected to the output, either directly or indirectly via the continuously variable sub-gear mechanism.

8 Claims, 10 Drawing Sheets

(56) References Cited

U.S. PATENT DOCUMENTS

Figure 1:
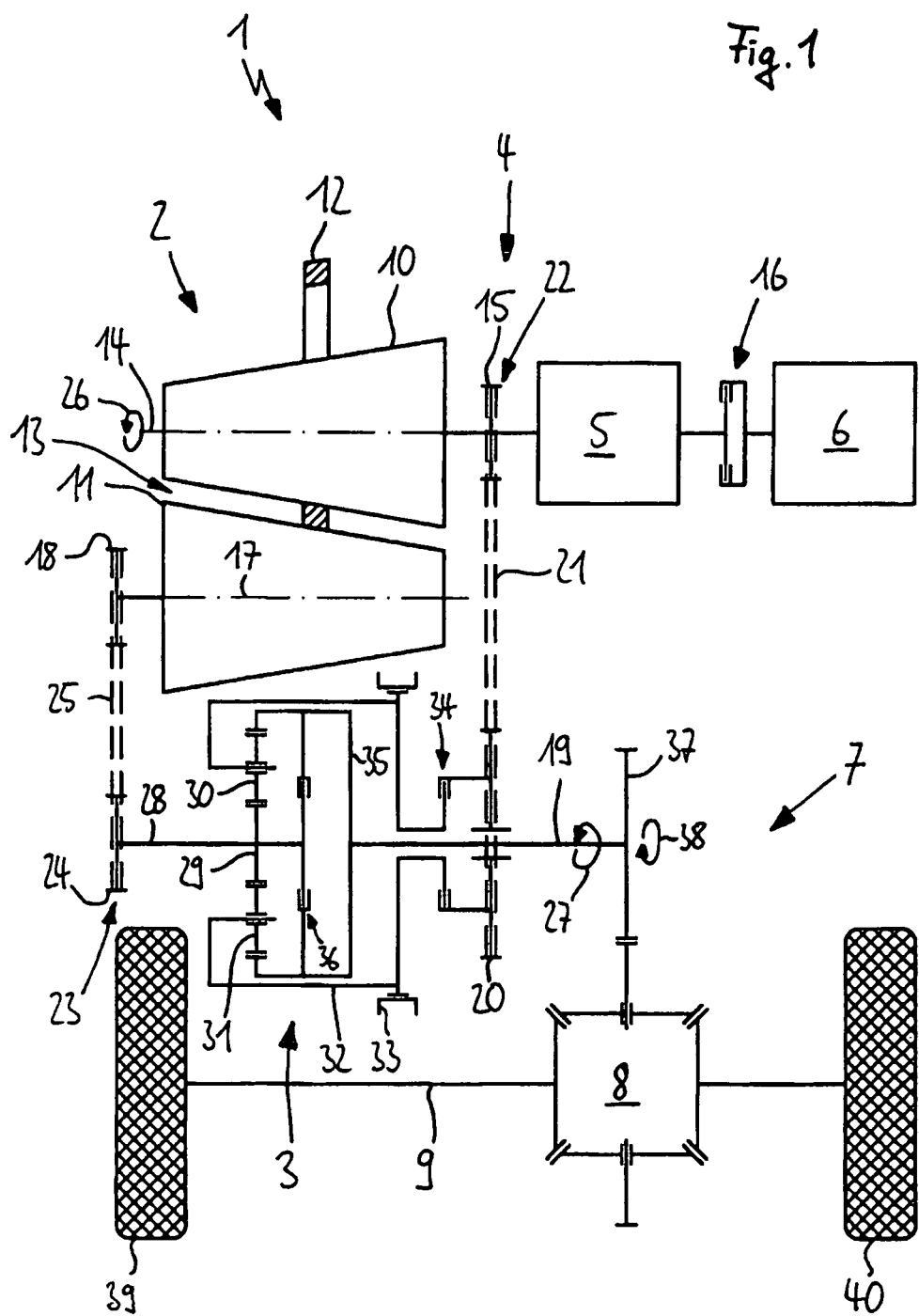

| | | |
|---|---|---|
| 2004/0124021 A1 | 7/2004 | Shirai et al. |
| 2005/0164825 A1 | 7/2005 | Reisch |
| 2006/0270517 A1 | 11/2006 | Rohs et al. |
| 2007/0021259 A1 | 1/2007 | Tenberge |

FOREIGN PATENT DOCUMENTS

| | | |
|---|---|---|
| DE | 196 31 243 | 2/1997 |
| DE | 196 31 294 | 2/1997 |
| DE | 198 28 844 | 1/1999 |
| DE | 199 15 370 | 10/2000 |
| DE | 100 36 966 | 4/2001 |
| DE | 102 09 514 | 10/2002 |
| DE | 10 2004 003 716 | 8/2005 |
| EP | 0 908 343 | 4/1999 |
| EP | 1 116 620 | 7/2001 |
| EP | 1 640 637 | 3/2006 |
| WO | WO 2006/043812 | 4/2006 |

OTHER PUBLICATIONS

German Search Report dated Jun. 30, 2008, 4 pages with English translation of relevant parts.
International Search Report , mailed May 3, 2008.

* cited by examiner

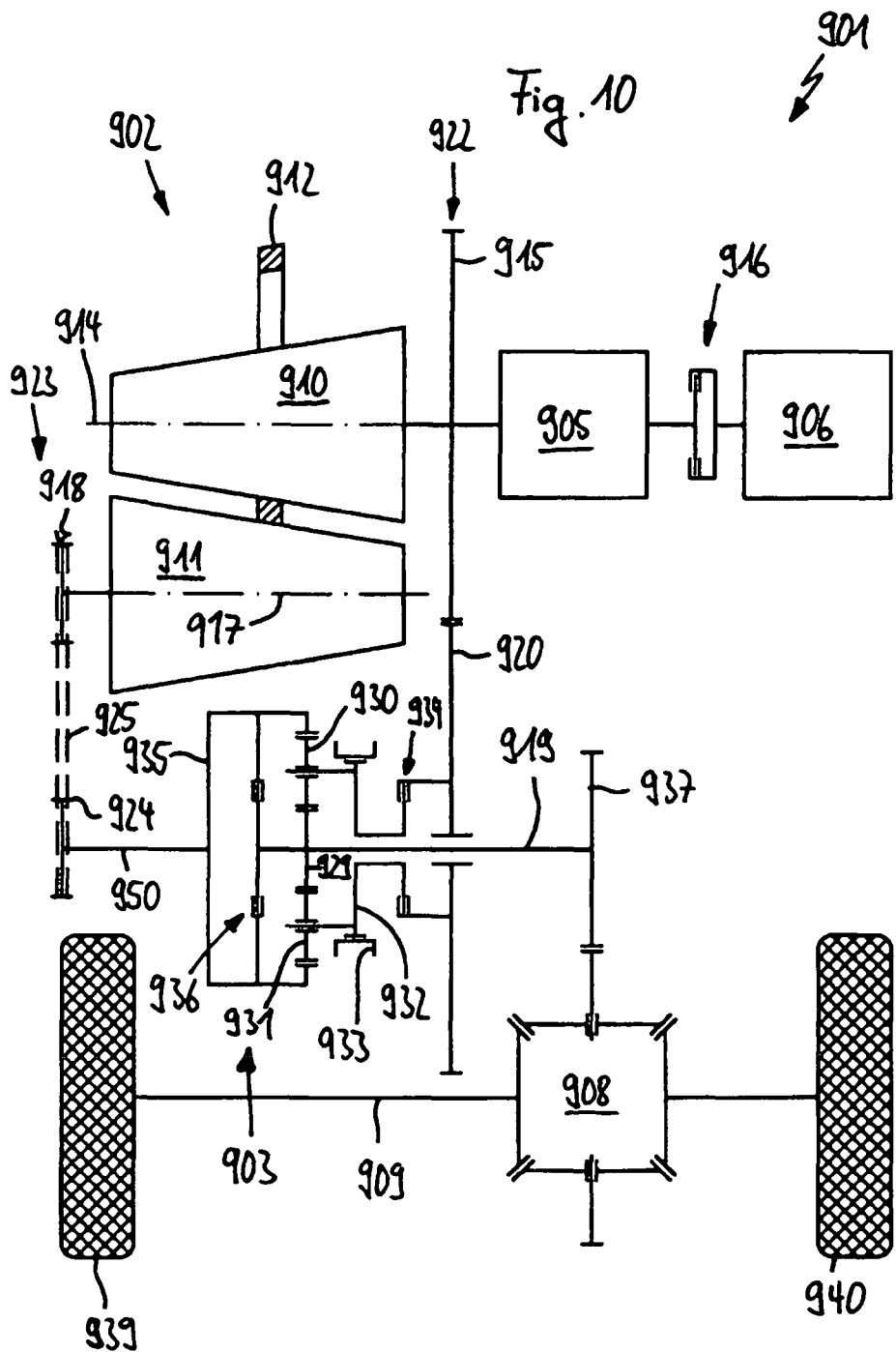

DRIVE ARRANGEMENT WITH AN INFINITELY VARIABLE SUB-GEAR BOX

CROSS REFERENCE TO RELATED APPLICATIONS

This application is the National Stage of PCT/DE2007/001912 filed on Oct. 25, 2007, which claims priority under 35 U.S.C. §119 of German Application No. DE 10 2007 009 631.5 filed on Feb. 26, 2007. The international application under PCT article 21(2) was not published in English.

The invention relates to a drive arrangement with an infinitely variable sub-gear box, which has two rotating gear members which are operatively connected to one another by means of a rotating connecting element, with a hybrid drive, which comprises a first drive and at least one further drive, and also with at least one output.

Drive arrangements of this type, which have at least two drive motors which are different from one another on the drive side, are already known from the prior art. For example, two electric motors which can be controlled separately from one another are connected upstream of a planetary gear box. Also, hybrid drives which comprise a combustion engine and an electric motor are on everyone's lips nowadays.

It is now valid to develop such known drive arrangements so that their use and effectiveness are improved.

The object of the invention is achieved by a drive arrangement with an infinitely variable sub-gear box, which has two rotating gear members which are operatively connected to one another by means of a rotating connecting element, with a hybrid drive, which comprises a first drive and at least one further drive, and also with at least one output, wherein at least one of the two drives is either directly or indirectly interactively connected to the output by means of the infinitely variable sub-gear box.

In the sense of the invention, the phrase "infinitely variable sub-gear box" covers practically all types of CVT gear boxes (Continuously Variable Transmission gear box) which can correspondingly be used advantageously.

The term "hybrid drive" is here understood to mean a type of drive of a drive arrangement or a gear box, in the case of which at least two different drives are connected upstream, intermediately and/or downstream of the drive arrangement or the gear box.

The difference between the drives can on the one hand be defined by means of a different power of the individual drives in the case of drives of the same generic type. On the other hand, completely different engine designs can also be used. For example, the first drive can be an internal combustion engine and the further drive can be an electric motor.

The statement that at least one of the two drives of the drive arrangement is interactively connected to the output indirectly by means of the infinitely variable sub-gear box describes a drive arrangement in the case of which the infinitely variable sub-gear box is arranged in a force polygon between one of the two drives and the output. Here, the force transmission of the drive onto the output takes place by means of the infinitely variable sub-gear box, that is to say indirectly.

In contrast hereto, with regard to at least one drive, an infinitely variable sub-gear box can be omitted in the case of the force transmission. In such a case, the drive forces are transmitted directly for example by means of a chain, by means of a toothed belt or by means of mutually meshing gearwheels between one of the two drives and the output. In a force polygon of this type, particularly no infinitely variable sub-gear box is provided.

A particularly advantageous configuration provides that the infinitely variable gear box is a cone and ring gear box.

It is advantageous, particularly in connection with a cone and ring gear box, if at least one drive is interactively connected to the output either directly or indirectly, by means of the infinitely variable sub-gear box, as a drive arrangement or a gear box with a hybrid drive of this type can be built in a particularly small manner from a structural point of view. This is particularly dependent on the fact that the cone lengths of the individual cones can be structured in a significantly shorter manner than usual, because, thanks to the first drive, cone regions of the cone and ring gear box, which are responsible for a certain gear ratio of the cone and ring gear box such as a starting gear ratio, can be omitted for example. Thus, the cone and ring gear box is structured in a particularly short manner, as, thanks to the first drive, for example an electric motor, cone regions which would be needed for starting are not required.

It is therefore advantageous if one of the two drives is used for starting whilst the second of the two drives is disengaged. In this manner, a type of starting gear ratio of the present drive arrangement can be realised in particular. What is meant with the designation "starting gear ratio" in the sense of the invention is a gear ratio which provides a first gear of a gear box, particularly of a vehicle gear box, as is sufficiently well known from the prior art.

One of the two drives can also be used similarly advantageously for the provision of an overdrive of the drive arrangement, whilst the second of the two drives is disengaged or runs idle or is otherwise used, for example for electricity generation.

It is correspondingly advantageous if the first drive starts whilst bypassing the infinitely variable sub-gear box of the drive arrangement. Here, it is, as already mentioned previously, not necessary that a first gear of the drive arrangement is provided by means of the infinitely variable sub-gear box.

It is advantageous if a planetary gear box is arranged between at least one drive and an output of the drive arrangement. A reversal of the direction of rotation can be realised in the gear box in a structurally simple manner by means of a planetary gear box. In this manner, a reverse gear is created particularly simply from a structural point of view for example.

A further configuration provides that the infinitely variable sub-gear box is arranged between a first drive and a further drive. In this manner, the construction of the present drive arrangement is structured even more compactly.

It is advantageous if the first drive and/or the further drive allow a first drive direction and the further drive additionally enables a further drive direction different from the first drive direction. In this manner, on the one hand, both drives can be used cumulatively or alternatively for a first drive direction. For example, the first drive provides a first forwards gear of the drive arrangement and the further drive, for example in combination with a cone and ring gear box, provides further forwards gears.

On the other hand, the first drive can then enable a further drive direction, which is different from the first drive direction, as a result of which a reversal of direction of rotation of the first drive direction by means of a gear box device provided to this end, for example by means of a planetary gear box, can be omitted. For example, the further drive direction provides a reverse gear of the drive arrangement.

It is advantageous here if one of the two drives is an electric motor. Broad load ranges of the drive arrangement can be covered by means of an electric motor. For example, these are starting procedures in the case of motor vehicles. Particularly a first gear box gear or a reverse gear can be advantageously realised with the electric motor.

In order to realise long-term loaded operation of the drive arrangement, it is advantageous on the other hand if one of the two drives is an internal combustion engine.

It is advantageous if a first of the two drives is a starting device for the further drive. For example, a starting device of this type can be provided by means of an electric motor which constitutes the first of the two drives with respect to the present drive arrangement. Thus, an otherwise customary separate E-starter for the internal combustion engine can be omitted.

It is furthermore advantageous if a start device and a drive to be started are synchronised by means of the infinitely variable sub-gear box or can be synchronised by means of a suitable selection of the gear ratio.

A further configuration provides that the infinitely variable sub-gear box is in direct and/or indirect operative contact with a sun gear of a planetary gear box. In this manner, a reversal of direction of rotation can be achieved in a simple manner from a constructive point of view in the force polygon which is realised by means of the infinitely variable sub-gear box.

It is advantageous if a clutch is arranged between at least one of the two drives and the output. It is possible by means of the clutch to disengage at least one of the two drives in particular from the infinitely variable sub-gear box. Thanks to the disengagement, a currently non-driving drive does not compulsorily need to be moved as well. This is advantageous in a starting state of a vehicle for example if the electric motor is currently in use as the drive and the internal combustion engine is only engaged in a later operating state.

Should a force transmission which does not involve a reversal of direction of rotation take place between one of the two drives and an output, it is advantageous, because it is constructively simple, if a chain or a drive belt is arranged between at least one of the two drives and the output.

Should a reversal in the direction of rotation be realised in a manner which is not very complicated from a structural point of view, however, it is advantageous if directly mutually meshing gear wheels are arranged between at least one of the two drives and the output.

Further advantages, aims and properties of the present invention are explained on the basis of the description of the attached drawing in which vehicle drive arrangements are illustrated, which drive arrangements have a first and second drive and in the case of which drive arrangements a cone and ring gear box can be engaged between at least one of a plurality of drives and an output.

In the figures

Figure 2:
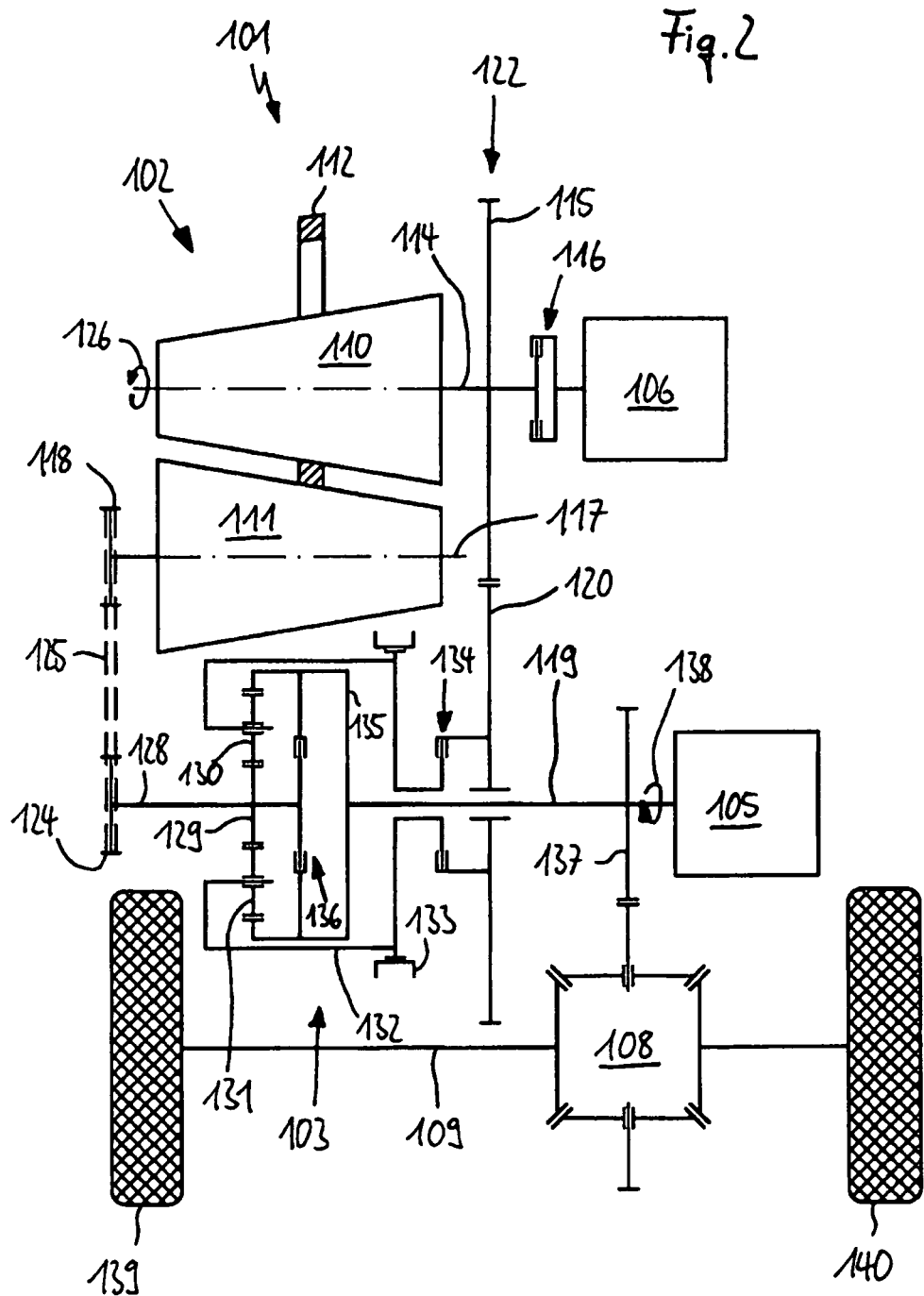
Figure 3:
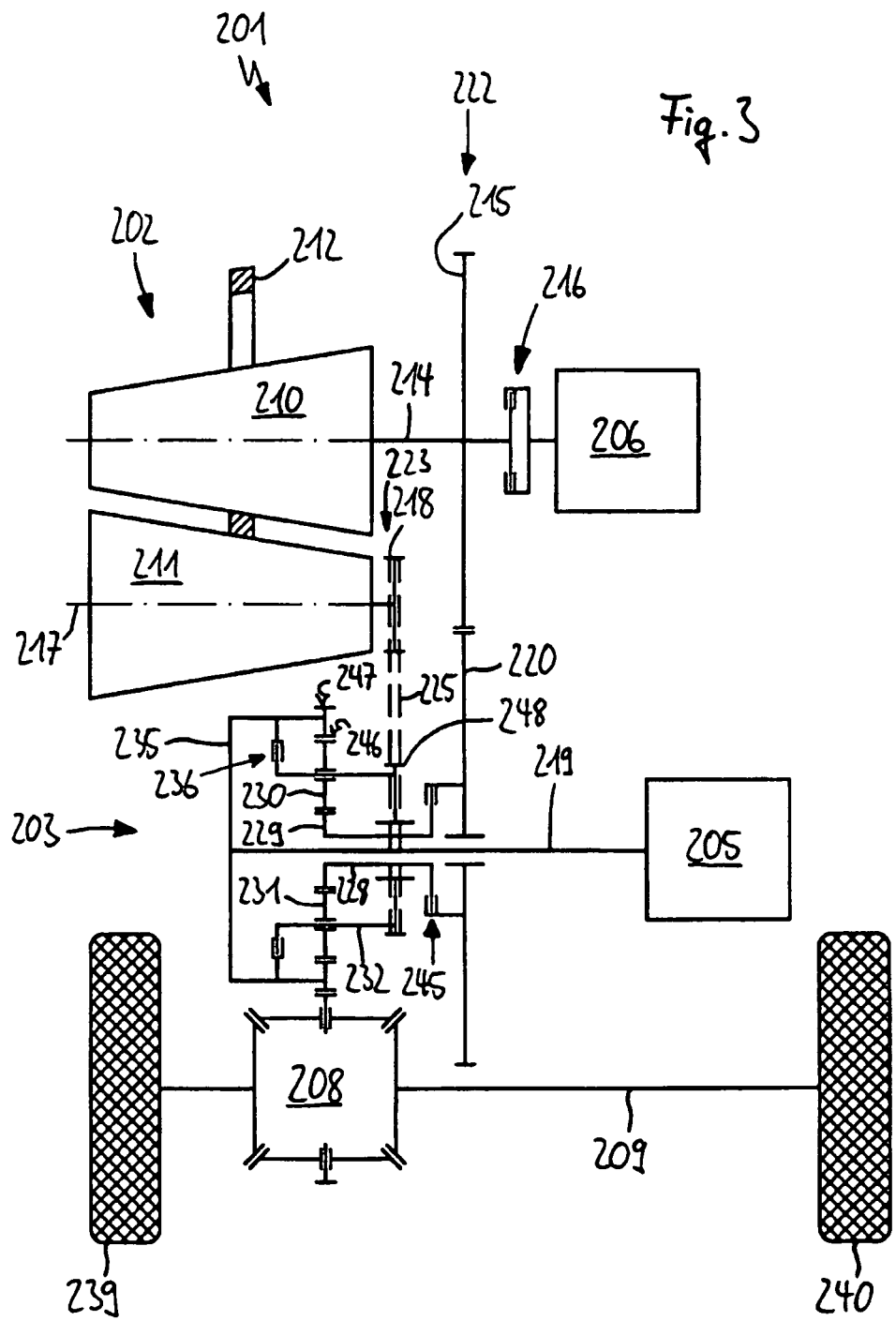
Figure 4:
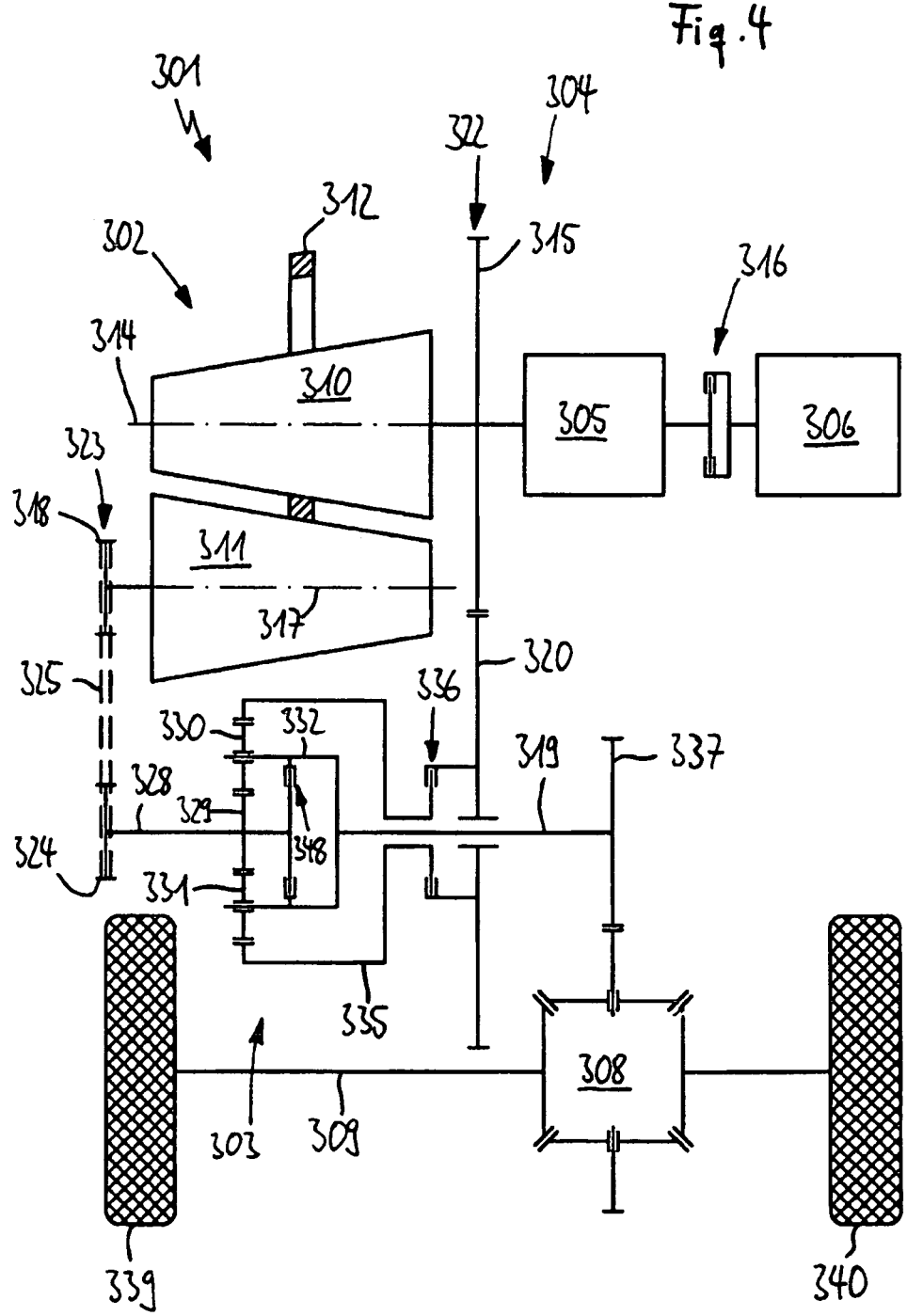
Figure 5:
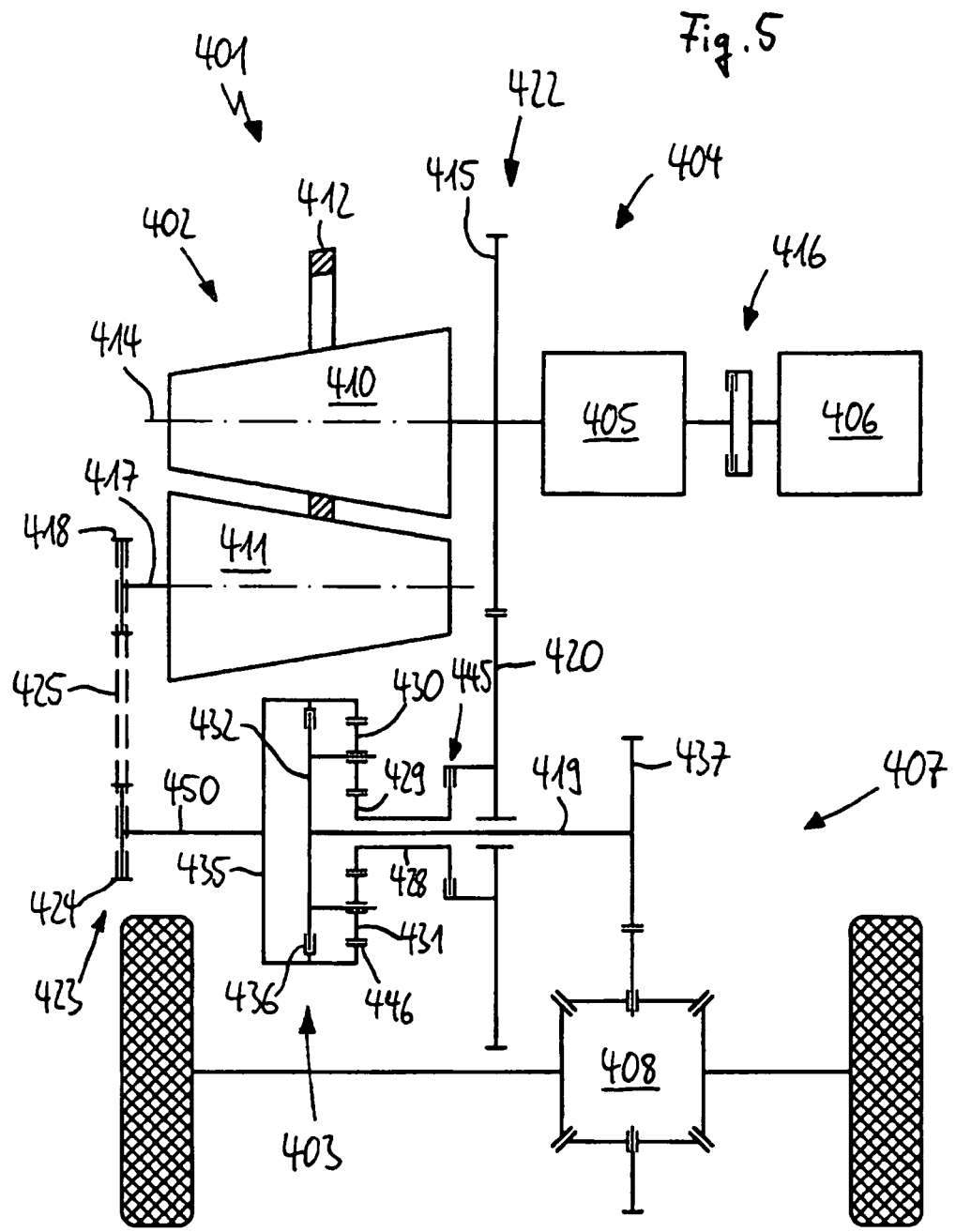
Figure 6:
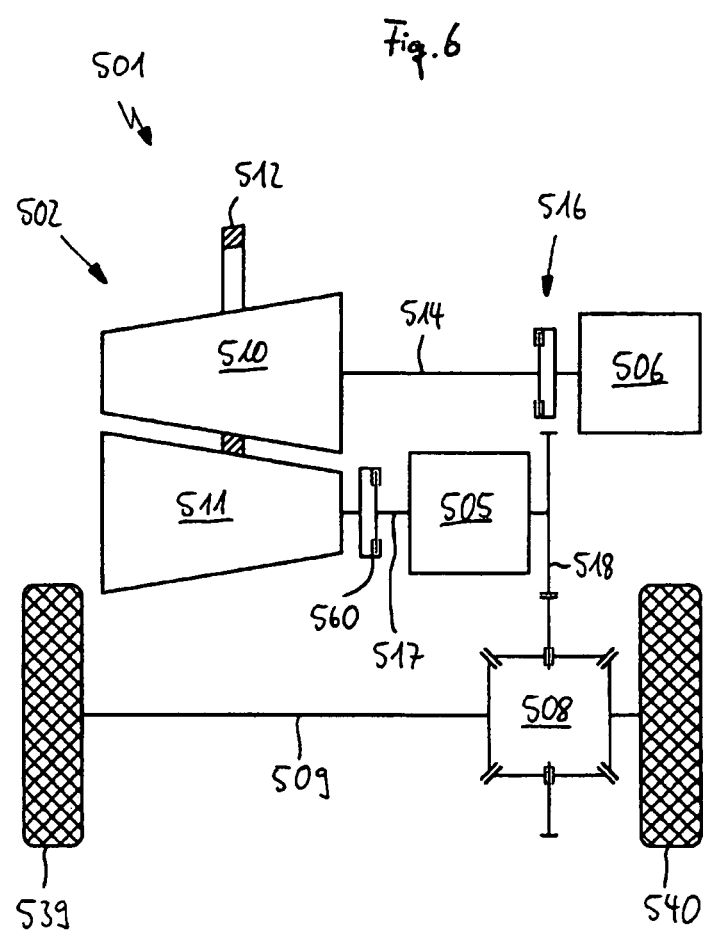
Figure 7:
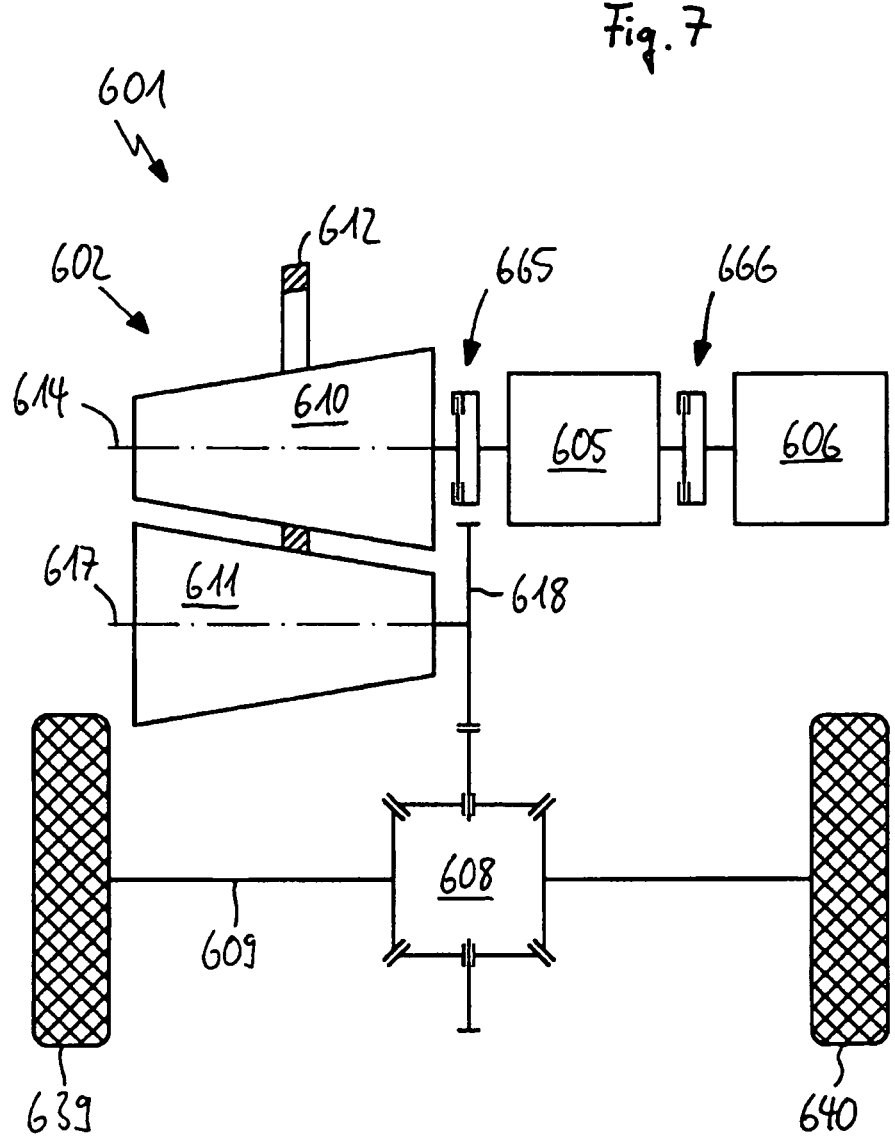
Figure 8:
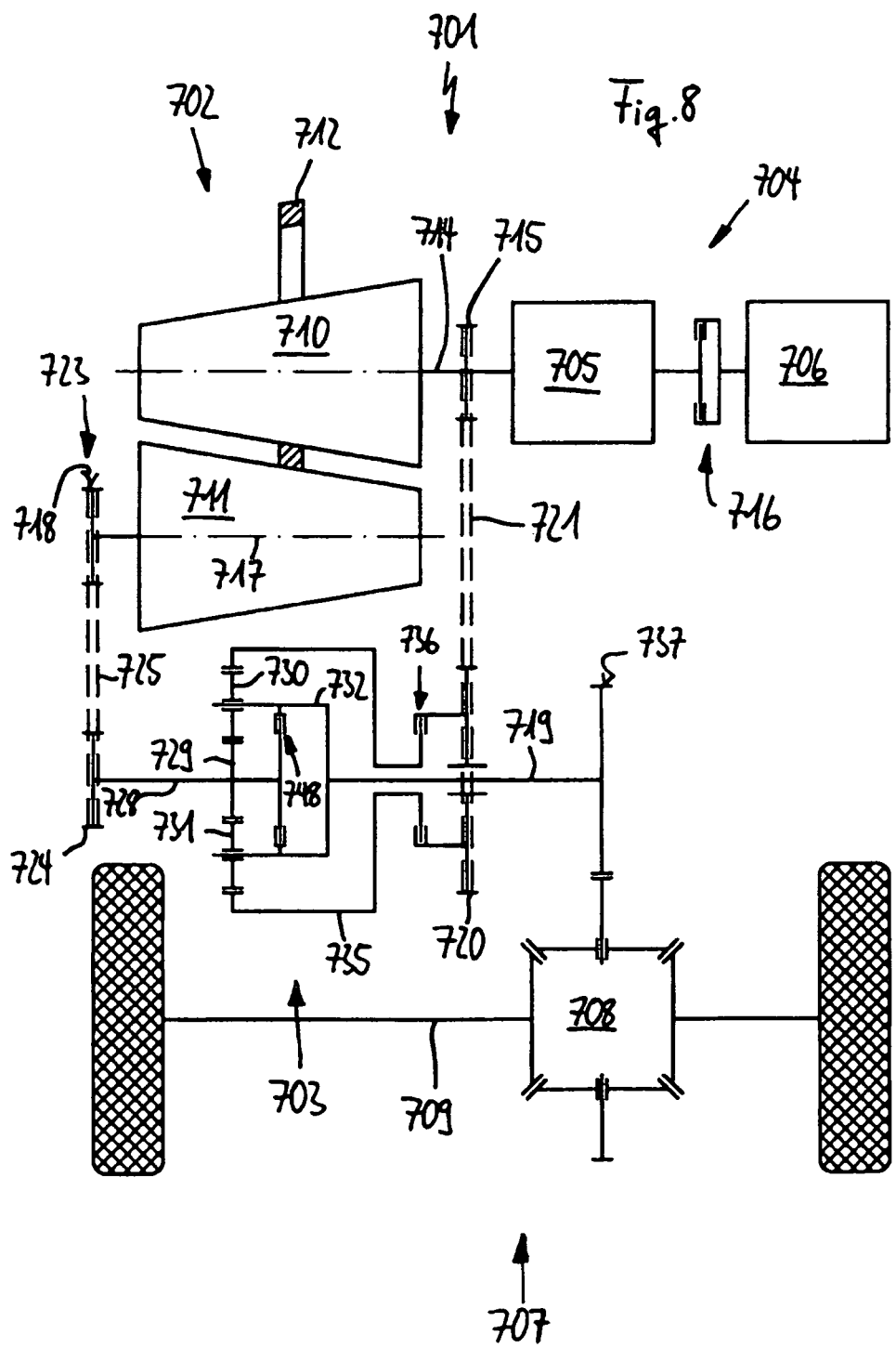
Figure 9:
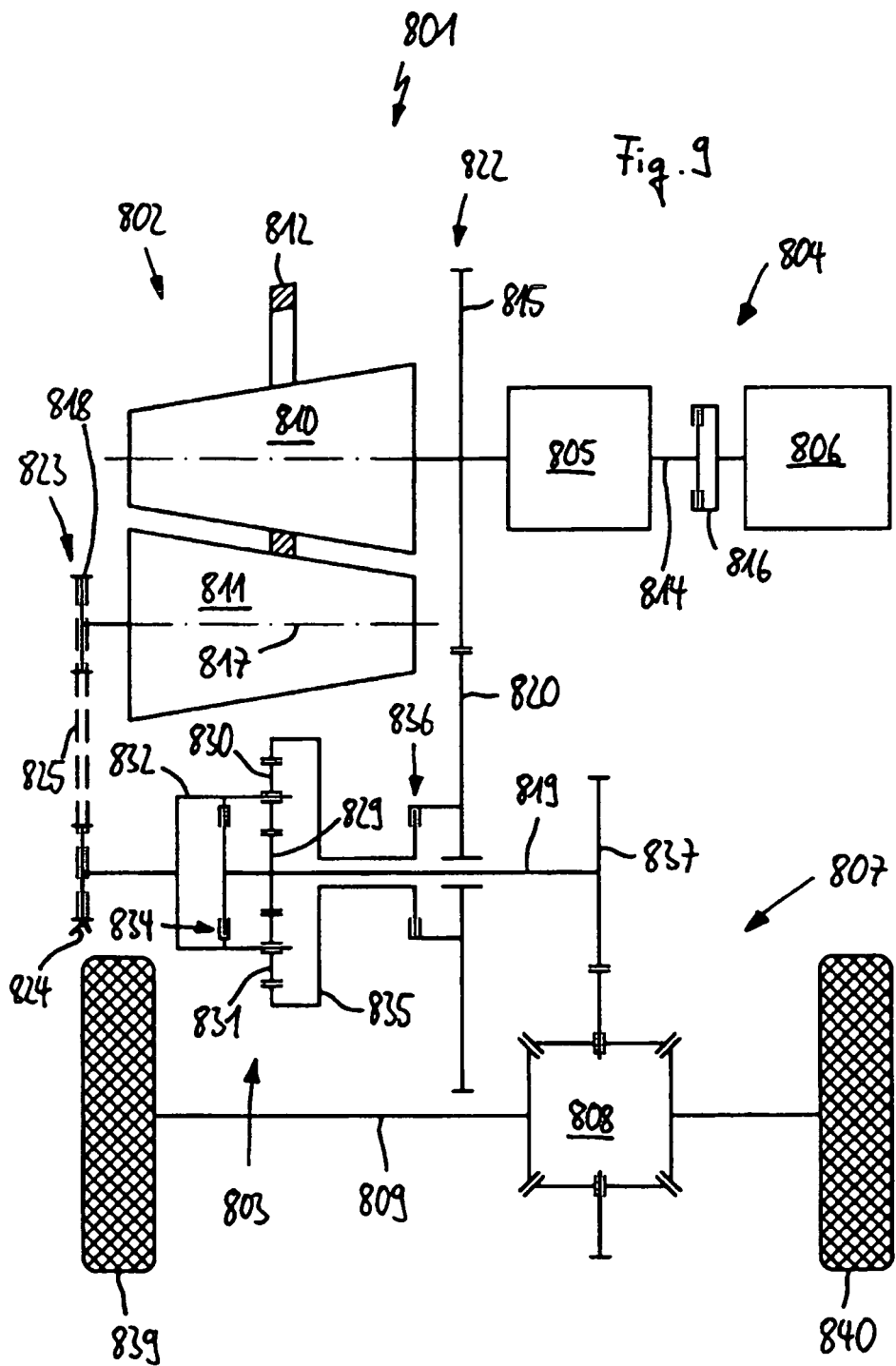

FIG. 1 schematically shows a first exemplary embodiment of a vehicle drive arrangement with a cone and ring gear box, electric motor and an internal combustion engine which can be engaged with the cone and ring gear box;

FIG. 2 schematically shows a further exemplary embodiment of a vehicle drive arrangement with a cone and ring gear box, with an internal combustion engine which can be engaged with the cone and ring gear box, and with an electric motor which is connected downstream of the cone and ring gear box and interacts directly with an output of the vehicle drive arrangement;

FIG. 3 schematically shows a further exemplary embodiment of a vehicle drive arrangement with a cone and ring gear box, with an internal combustion engine which can be engaged with the cone and ring gear box, and with an electric motor which is connected downstream of the cone and ring gear box and interacts with an output of the vehicle drive arrangement by means of a planetary gear box;

FIG. 4 schematically shows a further exemplary embodiment of a vehicle drive arrangement with a cone and ring gear box, with an internal combustion engine, which can be engaged with the cone and ring gear box, or electric motor which either indirectly, by means of mutually meshing gear wheels, or directly, by means of a chain drive, interact with an output of the vehicle drive arrangement;

FIG. 5 schematically shows an alternative exemplary embodiment of a vehicle drive arrangement with a cone and ring gear box and an internal combustion engine, which can be engaged with the cone and ring gear box, or electric motor;

FIG. 6 schematically shows an exemplary embodiment of a particularly simply constructed vehicle drive arrangement with a cone and ring gear box, with an internal combustion engine which is connected upstream of the cone and ring gear box and can be disengaged and with an electric motor which is connected downstream of the cone and ring gear box and can be disengaged;

FIG. 7 schematically shows an exemplary embodiment of a further particularly simply constructed vehicle drive arrangement with an internal combustion engine and an electric motor which are connected upstream of a cone and ring gear box in a disengageable manner;

FIG. 8 schematically shows a further vehicle drive arrangement with a cone and ring gear box, with an internal combustion engine or electric motor which can be engaged with the cone and ring gear box and which either indirectly or directly interact with an output of the vehicle drive arrangement by means of a chain drive in each case;

FIG. 9 schematically shows a further exemplary embodiment of a vehicle drive arrangement with a cone and ring gear box, with an internal combustion engine which can be engaged with the cone and ring gear box, and with an electric motor which is connected downstream of the cone and ring gear box and interacts with an output of the vehicle drive arrangement by means of an alternative planetary gear box; and FIG. 10 schematically shows an exemplary embodiment of a vehicle drive arrangement with a cone and ring gear box, with an internal combustion engine which can be engaged with the cone and ring gear box, and with an electric motor which is connected downstream of the cone and ring gear box and interacts with an output of the vehicle drive arrangement by means of a further alternative planetary gear box.

The drive arrangement 1 shown in FIG. 1 essentially consists of a cone and ring gear box 2 known from the prior art and a planetary gear box 3, wherein both an electric motor 5 and an internal combustion engine 6 are flange mounted on the drive side 4. On the output side 7, a differential gear box 8 is provided on a drive axle 9 of a vehicle (not illustrated here).

The cone and ring gear box 2 has an input cone 10, an output cone 11 and a friction ring 12 which connects these two cones 10, 11. The friction ring 12 runs to and fro in an infinitely variable manner in a gap 13 between the two cones 10 and 11, wherein an infinitely variable gear ratio is thereby realised. The friction ring 12 here encompasses the input cone 10.

A drive shaft clutch 16 is arranged between the electric motor 5 and the internal combustion engine 6, with the aid of which drive shaft clutch the internal combustion engine 6 can, if required, be disengaged from the drive shaft 14 on the drive side 4.

The input cone 10, on which the electric motor 5 and the internal combustion engine 6 are flange mounted, rotates about a drive axle 14. A drive shaft sprocket 15 is provided between the input cone 10 and the two motors 5, 6.

The output cone 11 of the cone and ring drive 2 rotates about an output shaft 17 of the cone and ring gear box 2. An output shaft sprocket 18 is fixed to the output shaft 17.

Drive forces of the motors 5, 6 can be directly, with inclusion of the planetary gear box 3 and bypassing of the cone and ring gear box 2, or accordingly indirectly, with inclusion of the cone and ring gear box 2 and the planetary gear box 3, transmitted onto a main output shaft 19 by means of the drive shaft sprocket 15 or the output shaft sprocket 18.

To this end, the planetary gear 3 is connected to a first force input sprocket 20 via a clutch 34 which communicates with the drive shaft sprocket 15 by means of a drive chain 21. The "drive shaft sprocket 15-force input sprocket 20-first drive chain 21" assembly unit realises a first train of forces 22.

A second train of forces 23 is realised by means of the "output shaft sprocket 18—second force input sprocket 24—second drive chain 25" assembly unit.

The possibility exists, by means of the first train of forces 22, to transmit drive forces of the motors 5, 6 directly onto the main output shaft 19. The second train of forces 23 is provided to transmit drive forces of the motors 5, 6 via the cone and ring gear box 2 onto the main output shaft 19. In the case of the latter possibility, the gear box gear ratio can be changed in line with requirements.

A change in the direction of rotation with respect to the drive shaft 14 and the main output shaft 19 takes place neither in the case of the use of the first train of forces 22 nor in the case of the use of the second train of forces 23.

If, however, such a change in the direction of rotation between the drive shaft direction of rotation 26 and a main output shaft direction of rotation 27 is desired or necessary, the planetary gear box 3 can accordingly be integrated into the force flow, as explained by way of example in the following on the basis of FIG. 3.

The planetary gear box 3 comprises a sun gear shaft 28. The sun gear 29 of the planetary gear box 3 is located on the sun gear shaft 28. The sun gear 29 hereby meshes with the planetary gears 30 and 31 (only two planetary gears are shown in this illustration).

These planetary gears are mounted on a planetary gear carrier 32. The planetary gear carrier 32 is in turn rotatably mounted about the main output shaft 19 and can be fixed to a gear box housing 33 of the drive arrangement 1, so that a rotation of the planetary carrier 32 is prevented.

Furthermore, the planetary gear carrier 32 has a planetary gear carrier clutch 34, by means of which the planetary gear carrier 32 can be engaged with or disengaged from the first force input sprocket 20.

The planetary gear box 3 additionally has a ring gear 35 which is fixed to the main output shaft 19 on the one hand and which can on the other hand be engaged with or disengaged from the sun gear shaft 28 of the planetary gear box 3 by means of a ring gear clutch 36.

Should a force transmission be transmitted by way of example between one of the motors 5 or 6 directly from the dive shaft 14 onto the output sprocket 37 of the main output shaft 19 without the intermediate connection of the cone and ring gear box 2, the planetary gear carrier clutch 34 is closed, so that a force flow exists between the first force input sprocket 20 and the planetary carrier 32. The forces are in this case transmitted from the planetary carrier 32 onto the planets 30 and 31 and from there onto the ring gear 35 which is fixed to the main output shaft 19. The ring gear clutch 36 is in this case open, so that the ring gear 35 and the sun gear shaft 28 are disengaged from one another. The drive forces finally make it via the main output shaft 19 to the main output sprocket 37 and from there to the differential gear box 8. The cone and ring gear box 2 and also the sun gear 29 are here carried along in rotation so that the torque is also transmitted via the sun gear 29 and therefore additionally via the cone and ring gear box 2.

In the case of the force transmission by means of the first drive chain 21 between the drive shaft sprocket 15 and the first force input sprocket 20, the drive shaft direction of rotation 26 and the main output shaft direction of rotation 27 do not stay identical, as a change in the direction of rotation takes place in the case of the previously described force flow via the planetary gear box 3.

If the force flow between the motors 5 or 6 and the main output shaft 19 takes place via the cone and ring gear box 2, the planetary gear carrier clutch 34 is opened so that the first force input sprocket 20 merely rotates without force transmission onto the ring gear 32.

If the ring gear clutch 36 is engaged in the case of such a force flow, then the forces transmitted from the output shaft 17 of the cone and ring gear box 2 onto the sun gear shaft 28 by means of the second drive chain 25 are transmitted directly onto the main output sprocket 37 via the ring gear clutch 36 and the main output shaft 19. No reversal in the direction of rotation between the drive shaft 14 and the main output sprocket 37 is realised in the process.

If, by contrast, the ring gear clutch 36 of the planetary gear box 3 is disengaged, the force flow from the sun gear shaft 28 is transmitted via the sun gear 29, the ring gear 35 and the main output shaft 19 onto the main output sprocket 37. Here, the planetary carrier 32 is fixed to the gear box housing 33 of the drive arrangement 1, so that the planetary carrier 32 does not rotate. In this variant, a reversal in the direction of rotation between the drive shaft direction of rotation 26 of the drive shaft 14 and the main output shaft direction of rotation 27 of the main output shaft 19 is present by means of the planetary gear box 3, so that the main output shaft 19 and thus the main output sprocket 37 have a main output shaft direction of rotation 38 opposed to the direction of rotation 26 of the drive shaft 14.

A force transmission between one of the motors 5 or 6 directly to the differential gear box 8 and therefore onto the drive shaft 9 of the two wheels 39 and 40 can be achieved structurally in a particularly simple manner by means of the present construction of the drive arrangement 1.

On the other hand, the force transmission and the rotational speed are varied by means of the cone and ring gear box 2. A reversal in the direction of rotation as described previously can be achieved structurally in a particularly simple manner by means of the present planetary gear box 3 which is connected intermediately between the drive shaft 14 and the differential gear box 8.

It goes without saying that one of the motors 5, 6 is also provided in the region of the main output shaft 19 and could be connected to the drive shaft 14 via a belt, chains or the like and/or instead of the drive chains 21, 25 could mesh the sprocket pairs 15, 20 and/or 18, 24 directly with one another.

The drive arrangement 101 shown in the FIG. 2 essentially has the same construction as the drive arrangement 1 from the FIG. 1.

The drive arrangement 101 likewise has a cone and ring gear box 102 as well as a planetary gear box 103. An electric motor 105 and an internal combustion engine 106 are also provided at the drive arrangement 101. However, the motors 105 and 106 are not located on a common drive shaft 114. Only the internal combustion engine 106 is arranged on the drive shaft 114 of the cone and ring gear box 102. The electric motor 105 is directly fixed to the main output shaft 119 of the gear box 101.

Furthermore, a drive shaft sprocket 115 and a first force input sprocket 120 mesh with one another directly so that a drive chain between these sprockets 115, 120 is not required. A reversal in the direction of rotation takes place with regard to the drive shaft 114 and the main output shaft 119 by means of the direct meshing of the two sprockets 115 and 120, so that in the case of a drive shaft direction of rotation 126, the main output shaft 119 rotates in an opposing main output shaft direction of rotation 138.

The cone and ring gear box 102 has an input cone 110 and an output cone 111, wherein the two cones 110, 111 communicate with one another by means of a friction ring 112. The friction ring 112 is axially displaceable with regard to the drive shaft 114 with respect to the two cones 110, 111.

The output cone 111 rotates about and on an output shaft 117, at the one end of which an output shaft sprocket 118 is provided. Drive forces which are generated by the internal combustion engine 106 are transmitted onto a second force input sprocket 124 of the main output shaft 119 by means of a drive chain 125.

The internal combustion engine 106 is connected to the drive shaft 114 by means of a drive shaft clutch 116 such that it can be engaged or disengaged.

In the region of the planetary gear box 103, a sun gear shaft 128 is to be seen as a part region of the main output shaft 119. A sun gear 129 is mounted on the sun gear shaft 128. The sun gear 129 is here in contact with planetary gears 130, 131 of the planetary gear box 103. The planetary gears 130, 131 are mounted on a planetary gear carrier 132 in such a manner that they are in direct contact with a ring gear 135 of the planetary gear box 103.

Furthermore, the planetary gear carrier 132 is connected to the first force input sprocket 120 via a planetary carrier clutch 134.

The planetary gear box 103 has a ring gear clutch 136. The force flow in the region of the planetary gear box 103 can be transmitted directly from the sun gear shaft 128 via the closed ring gear clutch 136 onto the ring gear 135 and therefore further via the main output shaft 119 onto the main output sprocket 137 by means of the ring gear clutch 136. In this case, the electric motor 105 runs idle. It can in this state be used for electricity generation for example.

The force flow is then further forwarded from the main output sprocket 137 onto the differential gear box 108 and from there by means of the drive axle 109 onto the two drive wheels 139 and 140.

If the ring gear clutch 136 is open, however, so that no force flow can be transmitted directly from the sun gear shaft 128 onto the ring gear 135, the drive forces flow from the sun gear shaft 128 via the sun gear 129 onto the planetary gears 130, 131 and further onto the ring gear 135. Here, a reversal in the direction of rotation between the sun gear shaft 128 and the main output shaft 119 in the region of the main output sprocket 137 is achieved. This is not the case in the case of a closed ring gear clutch 136, as the direction of rotation of the sun gear shaft 128 and the main output shaft 119 remains identical. In the case of a freely rotating planetary carrier 132, torque is then transmitted both via the sun gear 129 and the cone and ring gear box 102 and via the planetary gears 131. The planetary gear carrier clutch 134 must be closed in this case.

If the ring gear clutch 136 is open, the planetary carrier 132 can, in a special operating variant, be fixed to the housing 133 of the gear box 101 and the clutch 134 can also be opened so that a rotation of the planetary carrier 132 is prevented.

It goes without saying that in the case of this exemplary embodiment, the motors 105, 106 can on the one hand both be provided on the drive shaft 114. On the other hand, a force transmission between the drive shaft sprocket 115 and the first main output shaft sprocket 120 could also take place via a drive chain.

The drive arrangement 201 shown alternatively in FIG. 3 comprises a cone and ring gear box 202, a planetary gear box 203 and a differential gear box 208 which is in contact with a drive axle 209 which drives two drive wheels 239 and 240. The drive arrangement 201 is optionally driven by an electric motor 205 or an internal combustion engine 206.

The cone and ring gear box 202 essentially consists of an input cone 210, an output cone 211 and a friction ring 212. The input cone 210 rotates about a drive shaft 214. The internal combustion engine 206 is arranged on the drive shaft 214 by means of a clutch 216. The output cone 211 rotates about an output shaft 217. The output shaft 217 has an output shaft sprocket 218 at one of its ends.

In order to transmit a drive force introduced into the drive arrangement 201 by the internal combustion engine 206 onto a main output shaft 219, on the one hand a first train of forces 222 and on the other hand a second train of forces 223 can be used.

The first train of forces 222 is in the process essentially formed by the drive shaft sprocket 215 and a first force input sprocket 220. The first force input sprocket 220 is connected to a sun gear shaft 228 of the planetary gear box 203 by means of a sun gear shaft clutch 245. This means that the first train of forces 222 can transmit forces onto the planetary gear box 203 by means of the sun gear shaft clutch 245. This is not possible in the case of the sun gear shaft clutch 245 being open.

A sun gear 229 of the planetary gear box 203 is arranged at the end of the sun gear shaft 228 opposite the sun gear shaft clutch 245. The sun gear 229 is in contact with planetary gears 230, 231. The planetary gears 230, 231 are mounted on a planetary carrier 232. The planetary carrier 232 has a ring gear clutch 236 at one end. The planetary carrier 232 can be engaged with or disengaged from a ring gear 235 of the planetary gear box 203 by means of the ring gear clutch 236.

A ring gear inner toothing 246 of the ring gear 235 is in engagement with the planetary gears 230 and 231 of the planetary gear box 203. A ring gear outer toothing 247 of the ring gear 235 is in operative contact with the differential gear box 208.

The second train of forces 223 essentially consists of the output shaft sprocket 218, a drive chain 225 and a planetary gear carrier sprocket 248. The planetary gear carrier sprocket 248 is fixed to the planetary gear carrier 232.

A force transmission starting from the internal combustion engine 206, firstly via the cone and ring gear box 202 and the planetary gear box 203 onto the differential gear box 208 is possible by means of the previously described drive arrangement 201. A reversal of the direction of rotation is possible by means of the planetary gear box 203, so that on the one hand forwards gears and on the other hand reverse gears can be realised. If the ring gear clutch 236 is closed, that is to say if the ring gear 235 is in direct engagement with the planetary carrier 232, then no reversal in the direction of rotation takes place between the drive shaft 214 and the ring gear outer toothing 247. If the ring gear clutch 236 is open, however, then a force transmission does not take place between the planetary gear carrier 232 and the ring gear 235 via the clutch 236. Rather, the drive forces are transmitted onto the ring gear inner toothing 246 by means of the planetary gears 230, 231, as a result of which reversal in the direction of rotation, as described previously, takes place. The planetary gear carrier clutch 245 must be closed in this case.

A force transmission between the electric motor 205 and the differential gear box 208 likewise takes place via the planetary gear box 203. Here as well a forwards gear and a reverse gear can be realised, wherein reversals in the direction of rotation as well as rotational speed changes of the drive arrangement 201 are carried out directly by means of controlling the electric motor 205 and not by means of the planetary gear box 203 or the cone and ring gear box 202, as can happen in the case of the internal combustion engine 206. A same direction of rotation between the main output shaft 219, which also constitutes the drive shaft of the electric motor 205 at the same time, and the ring gear outer toothing 247 is achieved when the ring gear clutch 236 is closed. If the ring gear clutch 236 is open, the force flow between the electric motor 205 and the ring gear outer toothing 247 is closed via the planetary gears 230, 231. In this case, the direction of rotation of the main output shaft 219 is reversed with respect to the ring gear outer toothing 247. The planetary gear carrier clutch 245 must be closed in this case.

The drive arrangement 301 shown in FIG. 4 likewise has a cone and ring gear box 302, a planetary gear box 303, an electric motor 305 as well as an internal combustion engine 306 on the input side 304 and a differential gear box 308 with a drive axle 309 on the output side 307, on which drive axle drive wheels 339 and 340 are arranged.

The cone and ring gear box 302 comprises an input cone 310, an output cone 311 as well as a friction ring 312 which produces the contact between the two cones 310, 311. The input cone 310 is mounted on a drive shaft 314 which is driven directly by the electric motor 305 and/or the internal combustion engine 306. In order to achieve a force transmission from one of the motors 305, 306 onto a main output shaft 319, without using the cone and ring gear box 302 in the process, a drive shaft sprocket 315 is fixed to the drive shaft 314. The drive shaft sprocket 315 forms a first train of forces 322 with a first force input sprocket 320, via which train of forces a force flow between the drive shaft 314 and the main output shaft 319 can be established.

Should the drive forces be conducted via the friction ring gear box 302 to the main output shaft 319, this takes place by means of a second train of forces 323 which essentially consists of an output shaft sprocket 318, a second force input sprocket 324 and a drive chain 325, by means of which drive chain a connection is produced between the two sprockets 318 and 324.

In the case of a direct force transmission without a cone and ring gear box 302, a ring gear clutch 336 is closed. In this manner, drive forces can be transmitted from the first force input sprocket 320 onto a ring gear 335 of the planetary gear box 303. In the process, the drive forces are transmitted onto planetary gears 330 and 331 and from these onto a sun gear 329. From there, the drive forces are transmitted onto the sun gear shaft 328 and make it, in the case of a closed planetary carrier clutch 348, via a planetary carrier 332 onto the main output shaft 319 and from there via the main output sprocket 337 onto the differential gear box 308.

Should the force flow take place via the cone and ring gear box 302, then the ring gear clutch 336 is open and the planetary gear carrier clutch 348 is closed. Here, the drive forces make it via the second train of forces 323 onto the sun gear shaft 328 and via the ring gear clutch 348 onto the main output shaft 319 and from there via the main output sprocket 337 onto the differential gear box 308. By opening the planetary carrier clutch 348, the direction of rotation can be reversed and a reverse gear can be realised. As the reverse gear is only used for a short time, any losses through the planetary gear box 303 are acceptable.

The drive arrangement 401 illustrated in FIG. 5 essentially consists of a cone and ring gear box 402, a planetary gear box 403 as well as a differential gear box 408. An electric motor 405 as well as an internal combustion engine 406 are provided on a drive shaft 414 on the drive side 404 of the drive arrangement 401.

A drive shaft clutch 416 is arranged between the internal combustion engine 406 and the drive shaft 414, so that the internal combustion engine 406 can, if required, be disengaged from the drive shaft 414. This is advantageous for example if drive forces should only act on the drive shaft 414 by means of the electric motor 405. In the case in which the internal combustion engine 406 should provide the drive forces, the drive shaft clutch 416 is closed, wherein the electric motor 405 either only idles and if appropriate generates electricity or transmits further drive forces onto the drive shaft 414 in a supporting manner.

Both the input cone 410 of the cone and ring gear box 402 and a drive shaft sprocket 415 are attached to the drive shaft 414.

The cone and ring gear box 402 has an output cone 411 in addition to the input cone 410, wherein input cone 410 and output cone 411 are operatively connected by means of a friction ring 412. The output cone 411 rotates about an output shaft 417 of the cone and ring gear box 402. The output shaft 417 is in contact with an output shaft sprocket 418 and, by means of a drive chain 425, with a force input sprocket 424 of a ring gear shaft 450 of a ring gear 435 of the planetary gear box 403.

A second train of forces 423 of the drive arrangement 401 is formed by means of the connection via the two sprockets 418, 424 and the drive chain 425. The drive shaft sprocket 415 and a first force input sprocket 420 form a first train of forces 422 of the drive arrangement 401.

Drive forces can optionally be transmitted from the drive side 404 to the output side 407 of the drive arrangement 401 both by means of the first train of forces 422 and by means of the second train of forces 423.

The ring gear 435 communicates via a ring gear inner toothing 446 with planetary gears 430 and 431, wherein drive forces from the planetary gears 430, 431 are transmitted onto a planetary carrier 432. The planetary carrier 432 is directly connected to a main output shaft 419 which is in contact with the differential gear box 408 by means of a main output sprocket 437.

The planetary gear box 403 has a ring gear clutch 436 between the ring gear 435 and the planetary carrier 432. If the ring gear clutch 436 is closed and if driving forces are being transmitted by means of the second train of forces 423, then the drive forces are transmitted from the ring gear 435 directly onto the planetary carrier 432. From there, the drive forces are introduced directly into the main output shaft 419.

Should drive forces of the two drive motors 405, 406 be transmitted onto the second train of forces 423 not by means of the cone and ring gear box 402, but rather directly from the drive shaft 414 by means of the first train of forces 422 onto the planetary gear box 403, then the ring gear clutch 436 is open and a sun gear shaft clutch 445 is closed. In the process, the drive forces are then transmitted from the first force input sprocket 420 via the sun gear shaft clutch 445 onto a sun gear shaft 428 of the planetary gear box 403. From there, the drive forces make it onto a sun gear 429, from where they are transmitted onto the planetary gears 430, 431 and further onto the planetary carrier 432 and the main output shaft 419 connected thereto.

It goes without saying that one of the motors 405, 406 can also be arranged on the output side 407, for example on the main output shaft 419, and the other of the motors 405, 406 can be arranged on the input side 404. Furthermore, the first train of forces 422 can also have a drive chain, by means of which drive forces are transmitted from the drive shaft sprocket 415 onto the first drive input sprocket 420.

The drive arrangements 501 and 601 illustrated in FIGS. 6 and 7 stand out on account of a particularly simple construction. Both drive arrangements 501, 601 dispense with a planetary gear box, by means of which a reversal in the direction of rotation can be achieved for example.

Thus, the drive arrangement 501 has a cone and ring gear box 502 which comprises an input cone 510, an output cone 511 and a friction ring 512. Furthermore, the drive arrangement 501 comprises an internal combustion engine 506 which is fixed to a drive shaft 514 by means of a drive shaft clutch 516. The internal combustion engine 506 can be engaged with the cone and ring gear box 502 or disengaged from the cone and ring gear box 502 by means of the drive shaft clutch 516.

Furthermore, an electric motor 505 is arranged on an output shaft 517. The output shaft 517 is connected to the output cone 511 of the cone and ring gear box 502.

An output shaft clutch 560 is integrated into the output shaft 517 between the electric motor 505 and the output cone 511, by means of which output shaft clutch the electric motor 505 can be engaged onto the output cone 511 or disengaged from the output cone 511. The electric motor 505 is directly in operative connection with a differential gear box 508 of the drive arrangement 501 by means of the output shaft 517 and a drive shaft sprocket 518.

The drive forces are transmitted from the differential gear box 508 onto a drive axle 509 and from there onto drive wheels 539 and 540.

In this exemplary embodiment, the reverse gear is realised by the electric motor 505, wherein the cone and ring gear box 502 does not run idle when only the electric motor 505 is used as drive.

Even the drive arrangement 601 shown in FIG. 7 has a cone and ring gear box 602 with an input cone 610, an output cone 611 and a friction ring 612.

In contrast with the drive arrangement 501 from FIG. 6, both an electric motor 605 and an internal combustion engine 606 are arranged on a drive shaft 614 of the cone and ring gear box 602 in the case of the drive arrangement 601 from FIG. 7. In order to engage or disengage both the electric motor 605 and the internal combustion engine 606 with the drive shaft or from the drive shaft 614, an electric motor clutch 665 is provided between the electric motor 605 and the drive shaft 614 and an internal combustion engine clutch 666 is provided between the internal combustion engine 606 and the drive shaft 614. The electric motor clutch 665 can readily be omitted for reasons of weight.

An output shaft sprocket 618 is fixed to an output shaft 617 about which the output cone 611 of the cone and ring gear box 602 rotates. The output shaft sprocket is in operative contact with a differential gear box 608 so that drive forces can be transmitted from the output shaft sprocket 618 onto the differential gear box 608. A drive axle 609 is provided on the differential gear box 608, which drive axle has a first drive wheel 639 and a second drive wheel 640.

It goes without saying that in the case of these exemplary embodiments, the planetary gear box is preferably controlled in such a manner in each case that it is inoperative in the preferred direction of rotation so that losses which could be due to the planetary gear box are minimised and only occur in directions of rotation which occur less often.

The further drive arrangement 701 illustrated in FIG. 8 essentially consists of a cone and ring gear box 702 and a planetary gear box 703. On the one hand, an electric motor 705 and on the other hand an internal combustion engine 706 are arranged on the drive side 704 on a drive shaft 714. On the output side 707, a differential gear box 708 is provided on a drive axle 709 of a vehicle which is not shown in any more detail here.

The cone and ring gear box 702 comprises an input cone 710, an output cone 711 as well as a friction ring 712 arranged therebetween which ensures the contact between the two cones 710, 712. The input cone 710 is mounted on the drive shaft 714 here so that the input cone 710 can be driven directly by the electric motor 705 or the internal combustion engine 706.

A force transmission from one of the motors 705, 706 mentioned onto a main output shaft 719 of the drive arrangement 701 shown, without using the cone and ring gear box 702 in the process, can be transmitted directly via a drive shaft sprocket 715, a first drive chain 721 and a first force input sprocket 720.

If drive forces are conducted via the friction ring gear box 702 onto the main output shaft 719, this takes place here by means of a second train of forces 723 which essentially consists of an output shaft sprocket 718, a second force input sprocket 724 and a corresponding second drive chain 725. The output shaft sprocket 718 is arranged on an output shaft 717 with which the output cone 711 rotates. A connection between the output shaft sprocket 718 and the force input sprocket 724 is produced by means of the drive chain 725.

If a direct force transmission between the drive shaft 714 and the main output shaft 719 is desired, a ring gear clutch 736 is activated, that is to say, in this manner, the drive forces from the first force input sprocket 720 are transmitted onto a ring gear 735 of the planetary gear box 703 used here. The drive forces are, in the process, transmitted onto planetary gears 730 and 731 and also from these further onto a sun gear 729. From there, the drive forces are further transmitted onto a sun gear shaft 728 and make it, in the case of a closed planetary carrier clutch 748, via a planetary carrier 732 onto the main output shaft 719 and from there via the main output sprocket 737 of the main output shaft 719 onto the differential gear box 708.

If the force flow takes place via the cone and ring gear box 702, then the ring gear clutch 736 is not closed, but rather open and the planetary gear carrier clutch 748 is closed. Here, the drive forces make it by means of the second train of forces 723 onto the sun gear shaft 728 and via the ring gear clutch 748 onto the main output shaft 719. From there the drive forces make it via the main output sprocket 737 further onto the differential gear box 708.

By opening the planetary carrier clutch 748, the direction of rotation can be reversed and a reverse gear of the drive arrangement 701 can be realised. As the reverse gear is only used for a short time in practice, any power losses caused by the planetary gear box 703 are acceptable.

The drive arrangement 801 from FIG. 9 essentially comprises a cone and ring gear box 802 and a planetary gear box 803. On its drive side 804, the drive arrangement 801 has an electric motor 805 and an internal combustion engine 806. The internal combustion engine 806 can be decoupled from the present drive shaft 814 by means of a drive shaft clutch 816. A drive shaft sprocket 815 and an input cone 810 of the cone and ring gear box are also fixed to this drive shaft 814.

On an output side 807 of the drive arrangement 801, a differential gear box 808 is provided on a drive axle 809 with a first drive wheel 839 and a second drive wheel 840.

The differential gear box 808 is connected by means of a main output sprocket 837 to a main output shaft 819 which can be connected to the drive side 804 of the present drive arrangement 801 via a first train of forces 822 and/or a second train of forces 823.

With regard to the first train of forces 822, the drive shaft sprocket 815 meshes with a first force input sprocket 820 which can be in contact with a ring gear 835 of the planetary gear box 803 by means of a ring gear clutch 836. If the ring gear clutch 836 is closed, the forces are transmitted onto the ring gear 835 of the planetary gear box 803 and from there by means of a first planetary gear 830 and a secondary planetary gear 831 further onto a sun gear 829 which is fixed to the main output shaft 819.

The planetary gears 830, 831 are fixed on a planetary gear carrier 832 which comprises a planetary gear carrier clutch 834 and can come into contact with the main output shaft 819 directly by means of this planetary gear carrier clutch.

A second force input sprocket 824 is directly fixed to the planetary gear carrier 832, which force input sprocket is a constituent of the second train of forces 823. Should drive forces be transmitted from one of the two motors 805, 806 onto the main output shaft 819 via this second train of forces 823, then the ring gear clutch 836 is opened so that the force flow can be transmitted via the input cone 810 of the cone and ring gear box 802, via the friction ring 812 of the cone and ring gear box 802 onto an output cone 811 of the cone and ring gear box 802 and in the process onto an output shaft 817 of the cone and ring gear box 802. An output shaft sprocket 818 of the second train of forces 823 is fixed to the output shaft 817. The drive forces are transmitted from the output shaft sprocket 818 onto the second force input sprocket 824 by means of a drive chain 825 and therefore likewise make it onto the main output shaft 819 via the planetary gear box 803.

A reversal in the direction of rotation can be achieved at the main output shaft 819 by means of the planetary gear box 803 in that the planetary gear carrier clutch 834 is opened or closed.

The alternative drive arrangement 901 shown in FIG. 10 comprises a cone and ring gear box 902 and a planetary gear box 903.

The cone and ring gear box 902 consists in this exemplary embodiment of an input cone 910, an output cone 911 and a friction ring 912 which ensures the contact between the input cone 910 and the output cone 911. The input cone 910 rotates with a drive shaft 914 on which an electric motor 905 as well as an internal combustion engine 906 are mounted such that they can be engaged. A drive shaft clutch 916 is additionally connected between the internal combustion engine 906 and the drive shaft 914. The drive shaft 914 additionally has a drive shaft sprocket 915.

The output cone 911 rotates with an output shaft 917, at the one end of which an output shaft sprocket 918 is arranged.

The planetary gear box 903 has a sun gear 929 which is a constituent of a main output shaft 919 of the drive arrangement 901. Furthermore, the planetary gear box 903 has a planetary gear carrier 932 which can be fixed on a gear box housing 933.

The sun gear 929 meshes with planetary gears 930 and 931 which, in turn, are in contact with a ring gear 935 of the planetary gear box 903.

The planetary gear carrier 932 is in contact with a first force input sprocket 920 of the main output shaft 919 by means of a planetary gear carrier clutch 934. The first force input sprocket 920 forms a first train of forces 922 with the drive shaft sprocket 915, by means of which train of forces, drive forces can be transmitted from the drive shaft 914 onto the main output shaft 919. To this end, the planetary gear carrier clutch 934 must be closed, however, wherein the force flow is then not conducted via the cone and ring gear box 902.

The present drive arrangement 901 has a second train of forces 923 which is essentially formed from the already mentioned output shaft sprocket 918, a drive chain 925 and a second force input sprocket 924. The second force input sprocket 924 is here fixed directly to a ring gear shaft 950 of the ring gear 935.

Depending on the desired direction of rotation of the main output shaft 919, a ring gear clutch 936 is opened or closed.

The drive forces transmitted to the main output shaft 919 in this manner are conducted onto a differential gear box 908 by means of a main output sprocket 937. From this differential gear box 908, the forces make it onto a drive axle 909 with a first drive wheel 939 and a second drive wheel 940.

LIST OF REFERENCE SYMBOLS

1 Drive arrangement
2 Cone and ring gear box
3 Planetary gear box
4 Drive side
5 Electric motor
6 Internal combustion engine
7 Output side
8 Differential gear box
9 Drive axle
10 Input cone
11 Output cone
12 Friction ring
13 Gap
14 Drive shaft
15 Drive shaft sprocket
16 Drive shaft clutch
17 Output shaft
18 Output shaft sprocket
19 Main output shaft
20 First force input sprocket
21 First drive chain
22 First train of forces
23 Second train of forces
24 Second force input sprocket
25 Second drive chain
26 Drive shaft direction of rotation
27 Main output shaft direction of rotation
28 Sun gear shaft
29 Sun gear
30 First planetary gear
31 Second planetary gear
32 Planetary gear carrier
33 Gear box housing
34 Planetary gear carrier clutch
35 Ring gear
36 Ring gear clutch
37 Main output sprocket
38 Opposing direction of rotation of the main output shaft
39 First drive wheel
40 Second drive wheel
101 Drive arrangement
102 Cone and ring gear box
103 Planetary gear box
105 Electric motor
106 Internal combustion engine
108 Differential gear box
109 Drive axle
110 Input cone 111 Output cone
112 Friction ring
114 Drive shaft
115 Drive shaft sprocket
116 Drive shaft clutch
117 Output shaft
118 Output shaft sprocket
119 Main output shaft
120 First force input sprocket
122 First train of forces
124 Second force input sprocket
125 Drive chain
126 Drive shaft direction of rotation
128 Sun gear shaft
129 Sun gear
130 First planetary gear
131 Second planetary gear
132 Planetary gear carrier
133 Gear box housing
134 Planetary gear carrier clutch
135 Ring gear
136 Ring gear clutch
137 Main output sprocket
138 Opposing direction of rotation of the main output shaft
139 First drive wheel
140 Second drive wheel
201 Drive arrangement
202 Cone and ring gear box
203 Planetary gear box
205 Electric motor
206 Internal combustion engine
208 Differential gear box
209 Drive axle
210 Input cone
211 Output cone
212 Friction ring
214 Drive shaft
215 Drive shaft sprocket
216 Drive shaft clutch
217 Output shaft
218 Output shaft sprocket
219 Main output shaft
220 First force input sprocket
222 First train of forces
223 Second train of forces
225 Drive chain
228 Sun gear shaft
229 Sun gear
230 First planetary gear
231 Second planetary gear
232 Planetary gear carrier
235 Ring gear
236 Ring gear clutch
239 First drive wheel
240 Second drive wheel
245 Sun gear shaft clutch
246 Ring gear inner toothing
247 Ring gear outer toothing
248 Planetary gear carrier sprocket
301 Drive arrangement
302 Cone and ring gear box
303 Planetary gear box
304 Drive side
305 Electric motor
306 Internal combustion engine
307 Output side
308 Differential gear box
309 Drive axle
310 Input cone
311 Output cone
312 Friction ring
314 Drive shaft
315 Drive shaft sprocket
316 Drive shaft clutch
317 Output shaft
318 Output shaft sprocket
319 Main output shaft
320 First force input sprocket
322 First train of forces
323 Second train of forces
324 Second force input sprocket
325 Drive chain
328 Sun gear shaft
329 Sun gear
330 First planetary gear
331 Second planetary gear
332 Planetary gear carrier
335 Ring gear
336 Ring gear clutch
337 Main output sprocket
339 First drive wheel
340 Second drive wheel
401 Drive arrangement
402 Cone and ring gear box
403 Planetary gear box
404 Drive side
405 Electric motor
406 Internal combustion engine
407 Output side
408 Differential gear box
410 Input cone
411 Output cone
412 Friction ring
414 Drive shaft
415 Drive shaft sprocket
416 Drive shaft clutch
417 Output shaft
418 Output shaft sprocket
419 Main output shaft
420 First force input sprocket
422 First train of forces
423 Second train of forces
424 Second force input sprocket
425 Drive chain
428 Sun gear shaft
429 Sun gear
430 First planetary gear
431 Second planetary gear
432 Planetary gear carrier
435 Ring gear
436 Ring gear clutch
437 Main output sprocket
445 Sun gear shaft clutch
446 Ring gear inner toothing
450 Ring gear shaft
501 Drive arrangement
502 Cone and ring gear box
505 Electric motor
506 Internal combustion engine
508 Differential gear box
509 Drive axle
510 Input cone
511 Output cone
512 Friction ring 516 Drive shaft clutch
517 Output shaft
518 Output shaft sprocket
539 First drive wheel
540 Second drive wheel
560 Output shaft clutch
601 Drive arrangement
602 Cone and ring gear box
605 Electric motor
606 Internal combustion engine
608 Differential gear box
609 Drive axle
610 Input cone
611 Output cone
612 Friction ring
614 Drive shaft
617 Output shaft
618 Output shaft sprocket
639 First drive wheel
640 Second drive gear
665 Electric motor clutch
666 Internal combustion engine clutch
701 Drive arrangement
702 Cone and ring gear box
703 Planetary gear box
704 Drive side
705 Electric motor
706 Internal combustion engine
707 Output side
708 Differential gear box
709 Drive axle
710 Input cone
711 Output cone
712 Friction ring
714 Drive shaft
715 Drive shaft sprocket
716 Drive shaft clutch
717 Output shaft
718 Output shaft sprocket
719 Main output shaft
720 First force input sprocket
721 First drive chain
722 First train of forces
723 Second train of forces
724 Second force input sprocket
725 Second drive chain
726 Sun gear shaft
727 Sun gear
728 First planetary gear
729 Second planetary gear
730 Planetary gear carrier
735 Ring gear
736 Ring gear clutch
737 Main output sprocket
748 Planetary gear carrier clutch
801 Drive arrangement
802 Cone and ring gear box
803 Planetary gear box
804 Drive side
805 Electric motor
806 Internal combustion engine
807 Output side
808 Differential gear box
809 Drive axle
810 Input cone
811 Output cone
812 Friction ring 814 Drive shaft
815 Drive shaft sprocket
816 Drive shaft clutch
817 Output shaft
818 Output shaft sprocket
819 Main output shaft
820 First force input sprocket
822 First train of forces
823 Second train of forces
824 Second force input sprocket
825 Drive chain
829 Sun gear
830 First planetary gear
831 Second planetary gear
832 Planetary gear carrier
834 Planetary gear carrier clutch
835 Ring gear
836 Ring gear clutch
837 Main output sprocket
839 First drive wheel
840 Second drive wheel
901 Drive arrangement
902 Cone and ring gear box
903 Planetary gear box
905 Electric motor
906 Internal combustion engine
907 Differential gear box
908 Drive axle
909 Input shaft
910 Output shaft
911 Friction ring
914 Drive shaft
915 Drive shaft sprocket
916 Drive shaft clutch
917 Output shaft
918 Output shaft sprocket
919 Main output shaft
920 First force input sprocket
922 First train of forces
923 Second train of forces
924 Second force input sprocket
925 Drive chain
925 Sun gear
926 First planetary gear
927 Second planetary gear
928 Planetary gear carrier
929 Gear box housing
930 Planetary gear carrier clutch
931 Ring gear
932 Ring gear clutch
933 Main output sprocket
939 First drive wheel
940 Second drive wheel
950 Ring gear shaft

The invention claimed is:

1. A drive arrangement comprising:
an infinitely adjustable sub-gear box comprising two rotating gear members operatively connected to one another by means of a rotating connecting element;
a hybrid drive having a first drive and at least one further drive, and at least one output, with said hybrid drive comprising at least one electric motor, wherein at least one of the two drives is either directly or indirectly interactively connected to the output by means of the infinitely adjustable sub-gear box;
at least two clutches, coupled in series with each other, with a first clutch coupled on one side of said first drive, and a second clutch coupled on another side of said first drive, wherein said first drive is configured to be decoupled from said output via at least one of said at least two clutches;

wherein the infinitely variable sub-gear box is a cone and ring gear box, wherein the cone and ring gear box comprises an input cone, an output cone, and a friction ring connecting said input cone and said output cone;

wherein the friction ring runs to and fro in an infinitely variable manner in a gap between said input cone and said output cone to achieve an infinitely variable gear ratio, and wherein the first drive and/or the further drive allow a first drive direction and the further first drive enables a further drive direction different from a first drive direction reversal of direction of rotation of the first drive.

2. The drive arrangement according to claim 1, wherein one of the two drives is used for starting whilst the second of the two drives is disengaged.

3. The drive arrangement according to claim 1, wherein the further drive direction-realizes at least one reverse gear.

4. The drive arrangement according to claim 1, wherein one of the two drives is an electric motor.

5. The drive arrangement according to claim 1, wherein one of the two drives is an internal combustion engine.

6. The drive arrangement according to claim 1, wherein a first of the two drives is a starting device for the second of the two drives.

7. The drive arrangement according to claim 1, wherein a clutch is arranged between at least one of the two drives and the output.

8. The drive arrangement according to claim 1, wherein directly mutually meshing gear wheels are arranged between at least one of the two drives and the output.

* * * * *